United States Patent [19]

Turner

[11] Patent Number: 4,543,445
[45] Date of Patent: Sep. 24, 1985

[54] THERMOSTAT COVER

[75] Inventor: Donald R. Turner, Shelbyville, Ind.

[73] Assignee: Williams Industries, Inc., Shelbyville, Ind.

[21] Appl. No.: 579,014

[22] Filed: Feb. 10, 1984

[51] Int. Cl.⁴ .................. H02B 1/14; H01R 13/44; H05K 5/03

[52] U.S. Cl. ................ 174/5 R; 174/138 F; 219/330; 361/334

[58] Field of Search ............ 174/5 R, 66, 138 F; 200/304; 219/327, 328, 330; 334/85; 339/36, 198 J; 361/334, 419, 427

[56] References Cited

U.S. PATENT DOCUMENTS

| | | | |
|---|---|---|---|
| 3,621,197 | 11/1971 | Place | 174/5 R X |
| 4,008,419 | 2/1977 | Stearley | 174/5 R X |
| 4,055,724 | 10/1977 | Manecke et al. | 174/66 |

*Primary Examiner*—Laramie E. Askin

*Attorney, Agent, or Firm*—Barnes & Thornburg

[57] ABSTRACT

An electrically insulative shield is disclosed for engaging and covering a device in an electrical circuit. The shield includes a generally planar portion having first, second and third edges. When the shield is engaged to the device, these edges correspond generally in position to the first, second and third sides of the electrical device. A first gripping member extends outwardly from the planar portion adjacent the first edge. The gripping member includes an apertured portion for receiving a projection formed on the first side of the device. A first outwardly extending gripping hook member is provided adjacent the second edge. The first hook member grips a projection adjacent the second side of the device. A second outwardly extending gripping hook member is provided adjacent the third edge of the planar portion. The second hook member grips a projection adjacent the third side of the device.

10 Claims, 5 Drawing Figures

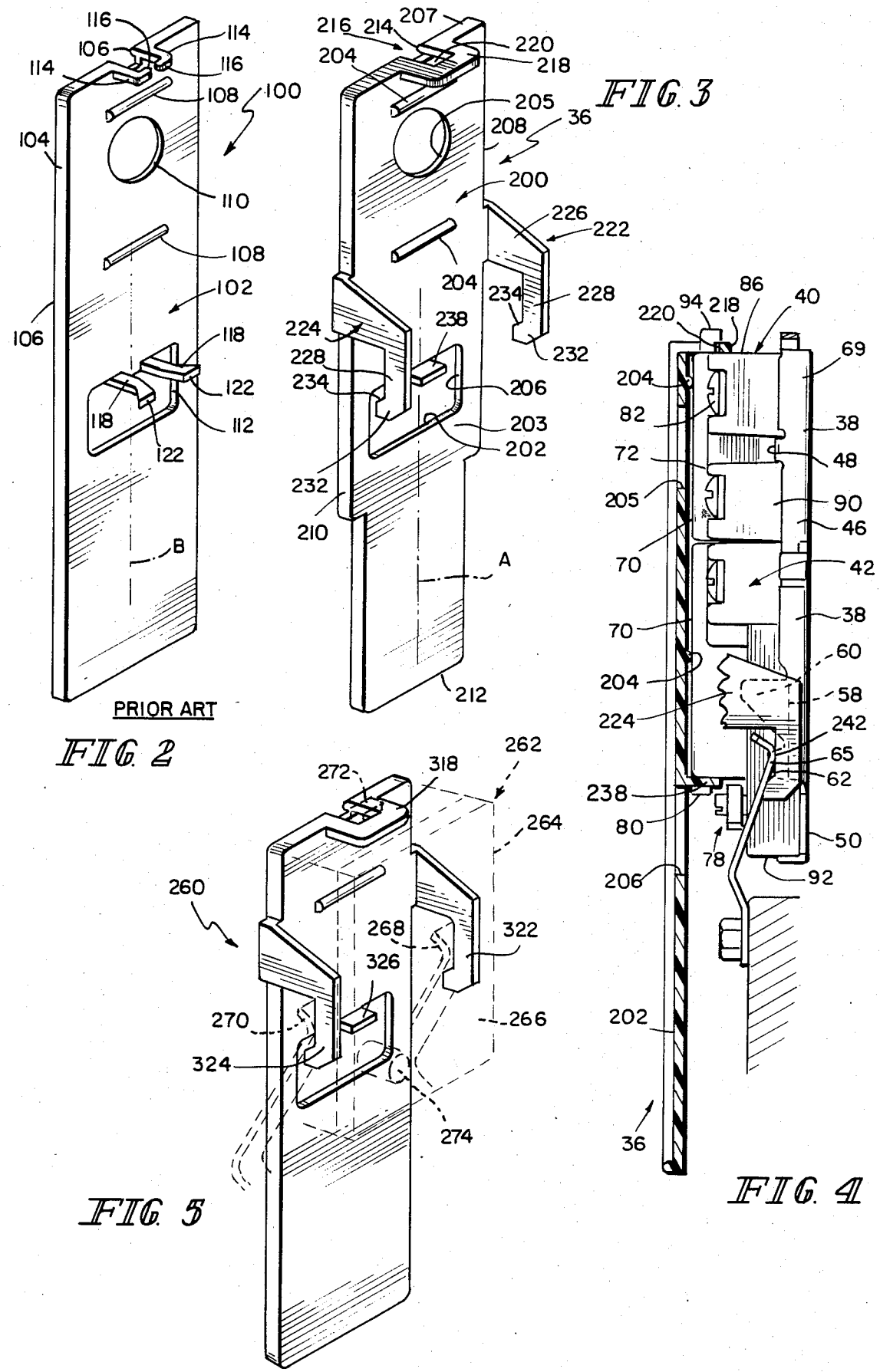

THERMOSTAT COVER

This invention relates to insulated covers and more particularly to insulative covers for devices which are used in electric circuits.

An electrically operated device such as a water heater usually includes an electrical circuit to supply electricity to the device. The circuit can include resistive elements, wires and circuit control devices such as circuit breakers, thermostats and switches. These circuit control devices usually include one or more terminals which are used for attaching wires to the circuit control device. With devices such as water heaters which require a large amount of electricity, the voltage and current running through the circuit can be quite high. This presents a danger to persons working in the vicinity of the exposed parts of the circuit, such as the terminals on the circuit control devices. Persons making contact with the exposed portions of the circuit may become shocked severely by the electricity running therethrough.

It is known to place electrically insulative shields over these exposed portions to reduce the chance of direct contact with the exposed portions. Such a shield is shown in FIG. 2 and described infra. Preferably, these shields are electrically insulative, inexpensive to manufacture, and are held securely onto the electrical device. It is an object of this invention to provide such a shield.

In accordance with the instant invention, in an electrical circuit, an electrically insulative shield is provided for covering a circuit device having a top surface, at least three side surfaces and at least three projections adjacent the side surfaces. A first projection extends outwardly from a first side surface. A second projection extends outwardly adjacent a second side surface and a third projection extends outwardly adjacent a third side surface. The shield comprises a generally planar portion bounded by an outside edge having first, second and third outside edge portions. A first gripping member extends outwardly from the planar portion, and includes an apertured portion for receiving the first projection. A first gripping hook member is disposed near the second outside edge portion, and extends outwardly from the planar portion to grip the second projection. A second hook member is disposed near the third outside edge portion of the planar portion and extends outwardly from the planar portion to grip the third projection.

Illustratively, each hook member includes a laterally extending portion extending laterally and outwardly between the planar portion and the projection of the device when the shield is engaged to the electrical device, a longitudinally extending portion extending generally parallel to an edge of the planar portion, and a fluke portion having a beveled surface for engaging a portion of the projection when the shield is engaged to the device.

One feature of the instant invention is that a shield is provided which has a four point connection to the electrical device. The first connection is the gripping member on the first side. The second and third connections comprise the first and second gripping hooks which are disposed adjacent opposed edges of the planar portion, and grip a structure adjacent two of the sides of the control device. The fourth connection is made by a laterally extending flange which grips the device medially between a pair of opposed sides. This four point connection has the advantage of providing a more stable connection between the shield and the circuit device which is less likely to wobble on the device than prior art shields. By making the connection more stable, the shield offers greater protection to one working in the vicinity of the circuit by decreasing the likelihood that the person will make contact with the electrically exposed portions of the device, and hence be shocked by the electricity running through the exposed portions.

The four point connection arrangement of the instant invention also makes the shield tamper resistant. Although the shield is easily installed and removed, it is more resistant to accidental removal by young children than known prior art devices.

Devices such as thermostats and circuit breakers often include actuable controls, such as buttons which can be pushed or knobs which can be turned. The four point connection arrangement disclosed by the instant invention can make these controls more accessible to the user by creating less obstruction around the controls than shields known in the prior art.

Additional features and advantages of the invention will become apparent to those skilled in the art upon consideration of the following detailed description of a preferred embodiment exemplifying the best mode of carrying out the invention as presently perceived. The detailed description particularly refers to the accompanying figures in which:

FIG. 2 is a perspective view of a prior art device;

FIG. 3 is a perspective view of the instant invention;

FIG. 4 is a side elevational view, partly broken away, of the instant invention; and FIG. 5 is an exploded view of another embodiment of the instant invention.

Figure 1:
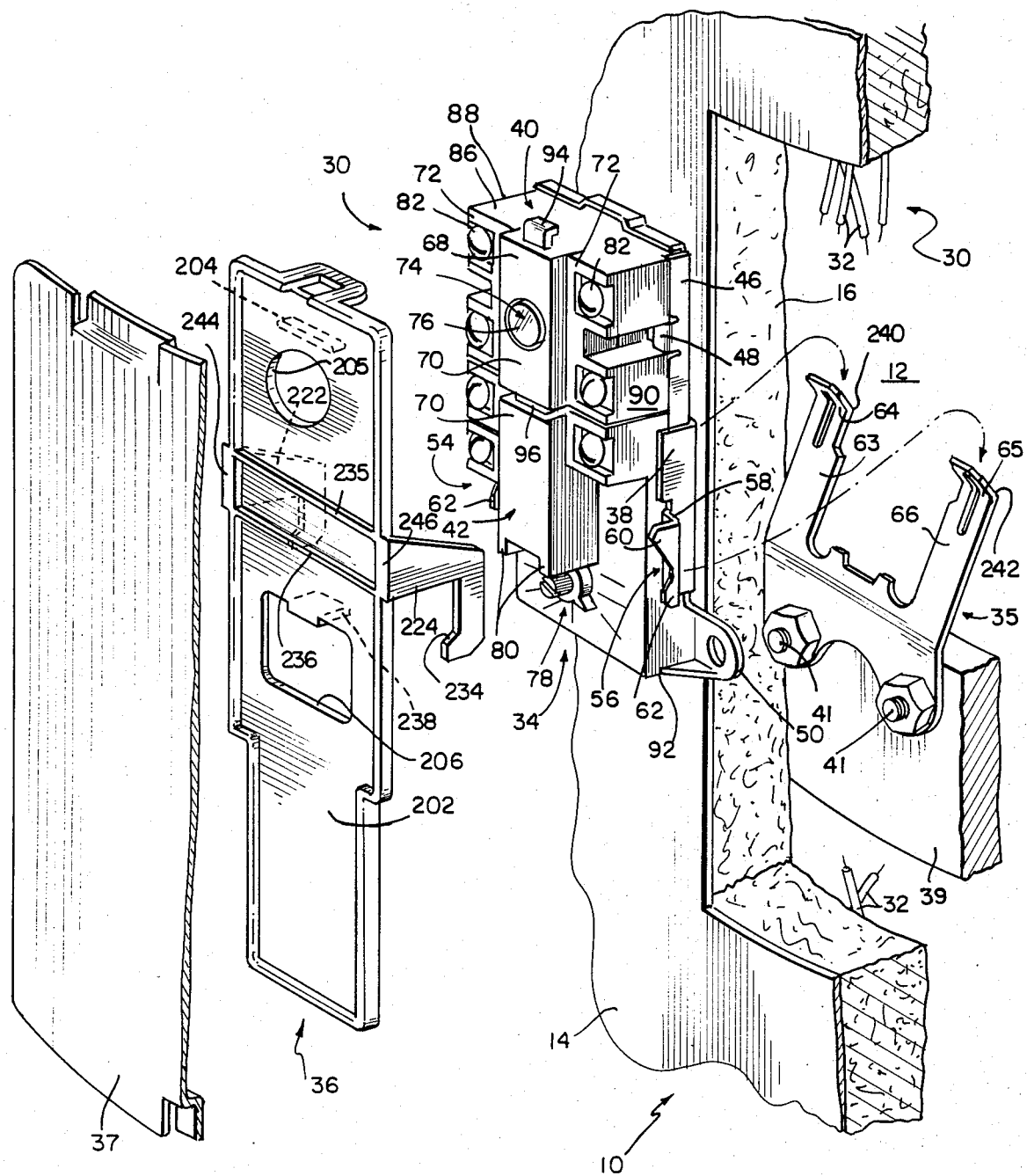
FIG. 1 is a perspective, exploded view of the instant invention in an environment in which it can be used.

An electrically activated water heater 10 is shown in FIG. 1 having a cylindrical water tank 12 in which water is heated. Encasing cylindrical water tank 12 is a cylindrical sleeve 14, typically made of metal, which forms the outer shell of water heater 10. A layer of insulation 16 is often placed between water tank 12 and cylindrical sleeve 14 to prevent heat from escaping from the water tank 12. Typically, the water heater also includes a water inlet pipe (not shown) leading to the bottom of the tank 12 through which water enters the cylindrical tank 12, a water outlet pipe (not shown) leading from the top of the tank 12 through which water leaves the tank 12, and top and bottom resistive elements (not shown) for resistively heating the water in the tank 12.

The top resistive element and bottom resistive element are parts of an electrical circuit 30 which also includes a plurality of wires 32 leading to the top and bottom resistive elements, and a circuit control device 34 for controlling the operation of the circuit 30. The circuit control device 34 is held against tank 12 by a spring clip 35 which is mounted to a platform 39 by bolts 41. An electrically insulative shield 36 is placed over and connected to the electrical device to shield someone working around the water heater 10 from the electricity flowing through circuit 30, and more particularly the electricity flowing through the exposed portions of the circuit 30. The exposed portions of the circuit 30 include the terminals 82 of the control device 34, and the exposed ends of wires 32 connected to the terminals 82.

On most water heaters 10, the control device 34, spring clip 35 and shield 36 are placed in the space between tank 12 and cylindrical sleeve 14. An access panel 37, also typically made of metal, is provided in sleeve 14 for enabling one to gain access to the shield 36, clip 35 and control device 34.

Electrical circuit control device 34 can include a metal mounting plate 38, a circuit breaker 40, and a thermostat 42. The metal mounting plate 38 is used to place the circuit breaker 40 and thermostat 42 in thermally conductive contact with water tank 12. The circuit breaker 40 and thermostat 42 control the flow of electricity through electrical circuit 30, and hence control the operation of water heater 10.

The metal mounting plate 38 includes peripheral, upstanding flanges 46, in which the circuit breaker 40 and thermostat 42 nest. The flanges 46 include staked portions 48 for staking the metal plate to either the circuit breaker 40 or thermostat 42. The plate 38 also includes outwardly extending tabs 50 having apertures through which a screw or other fastener (not shown) can pass for providing an alternative means for attaching plate 38 to the water tank 12. A second side projection receiving ear 54 and a third side projection receiving ear 56 are formed on opposing sides of plate 38. Each ear 54, 56 is formed by an outwardly extending flange 58, which extends at generally a right angle to peripheral flange 46, and a pair of upwardly extending tabs 60, 62, which lie in a plane generally parallel to peripheral upstanding flanges 46.

The tabs 60, 62 of ears 54, 56 provide a nest for a second side projection 64 and a third side projection 65. Second 64 and third 65 projections are formed by the angled ends 64, 65 of spring arms 63, 66 of clip 35 which mounts the control device 34 to the water tank 12. When the control device 34 is mounted to the water tank 12, the second side projection 64 extends outwardly adjacent a second side surface 88 of the device and the third side projection 65 extends outwardly adjacent a third side surface 90.

Circuit control device 34 includes a top surface 68, formed by the top surfaces of circuit breaker 40 and thermostat 42, a bottom surface 69 formed by metal plate 38, a first side surface 86, a second side surface 88, a third side surface 90, and a fourth side surface 92. The first and fourth side surfaces 86 and 92 are oppositely disposed, as are the second and third side surfaces 88 and 90 respectively.

Top surface 68 includes a central, generally planar raised surface 70 and a pair of peripheral, recessed surfaces 72. A control means 74, such as reset button 76 on circuit breaker 40 and thermostat control knob 78 on thermostat 42, are accessible from the top surface 68. Reset button 76 is disposed on the raised surface 70 of circuit breaker 40, and the thermostat control knob 78 is disposed on the recessed portion 72 of thermostat 42. A pair of spaced projections 80 are formed on, and extend outwardly from, the top surface 68 of thermostat 42. The projections 80 are disposed adjacent the thermostat control knob 78. Terminals 82 are provided on the recessed surfaces 72 of top surface 68 of both thermostat 42 and circuit breaker 40, and provide means for connecting the wires 32 of electrical circuit 30 to the circuit breaker 40 and thermostat 42. An outwardly extending projection 94 is formed on the first side surface 86 of circuit breaker 40. A similar projection 96 is formed on the top surface of thermostat 42.

A shield 100 constructed according to the prior art is shown in FIG. 2. Shield 100 is generally made out of a suitably electrically insulative plastic such as polypropylene. The shield 100 includes a relatively thin, rectangularly shaped planar portion 102 having edge portions 104 and a peripheral rim 106 extending around the periphery of planar portion 102 adjacent edge portions 104. A pair of laterally extending spacers 108 are provided on one surface of planar portion 102 to space the shield 100 from the electrical control device 34. A pair of apertures 110, 112 are formed in the planar portion 102 to enable the user to gain access to the reset button 76 of circuit breaker 40 and the thermostat control knob 78 of thermostat 42.

The shield 100 connects to the control device 34 through a first set of fingers 114 and a second set of fingers 118. When shield 100 is connected to device 34, the first set of fingers 114 are positioned adjacent the first side surface 86 of control device 34 for gripping projection 94. The fingers 114 include ends 116 which are directed toward each other. The second set of fingers 118 extend outwardly from the planar portion 102, adjacent aperture 112, and have ends 122 which are directed away from each other to grip the projections 80 formed on the thermostat 42 adjacent the thermostat control knob 78. The first and second sets of fingers 114, 118, respectively, are generally colinearly disposed on axis B of shield 100. Additionally, the individual fingers of sets 114, 118 are spaced closely together. This colinear, closely spaced arrangement permits shield 100 to wobble about axis B.

One embodiment of a shield 36 of the instant invention is shown in FIGS. 1, 3 and 4 and includes a generally rectangular planar portion 200 having a top surface 202 and a bottom surface 203. A pair of laterally extending spacer ribs 204 are disposed on bottom surface 203 to rest upon the top surface 68 of control device 34 to space the shield 36 from control device 34 and to help stabilize the shield 36 on control device 34. A pair of apertures 205, 206 are formed in planar portion 200 to enable a user to gain access to the circuit breaker reset button 76 and thermostat control knob 78 respectively.

Shield 36 is generally rectangular and includes a first edge 207, a second edge 208, a third edge 210, and a fourth edge 212. First 207 and fourth 212 edges are opposed edges. Second 208 and third 210 edges are opposed edges and are generally parallel to long axis A. A peripheral rim 214 is raised from top surface 202, and extends around the periphery of the planar portion 200.

In one embodiment of the instant invention, the planar portion is approximately 7 inches (17.78 cm) long and approximately 1.75 to 1.95 inches (4.445 cm to 4.953 cm) wide. The shield 36 is preferably made out of polypropylene such as Hercules 6923 or Shell 5820 and is made in a red-orange color to improve its visibility. In this embodiment, the planar portion 200 is generally relatively thin, being between about 0.065 to 0.125 inches (0.165 cm to 0.317 cm) thick.

First side edge 207 includes a centered recessed area 216 adjacent a C-shaped gripping ring member 218. Gripping member 218 is positioned so that when shield 36 is placed on control device 34, the aperture 220 in C-shaped gripping ring member 218 will receive the projection 94 formed on the first side surface 86 of circuit breaker 40. Gripping ring member 218 comprises the first point of the four-point connection of shield 36 to control device 34.

A first gripping hook member 222 extends outwardly from planar portion 200 adjacent second edge 208, and a second gripping hook member 224 extends outwardly from planar portion 200 adjacent third edge 210. The gripping hook members 222, 224 comprise the second and third points of the four-point connection of the instant invention.

Because the gripping hook members 222, 224 are disposed on opposed edge portions 208, 210, respectively, the hook members 222, 224 are sufficiently spacially separated from each other, 224, 222, and first gripping member 218 to substantially preclude movement of the shield 36 about axis A. In one embodiment, the hook members 222, 224 are disposed approximately 1.95 inches (4.953 cm) apart. The first 222 and second 224 hook members are preferably disposed at the same longitudinal position along their respective edges 208, 210. In one embodiment, both are disposed approximately 2.44 inches (6.198 cm) from first edge 207.

Each of first 222 and second 224 gripping hooks is generally planar and includes a portion 226 which extends generally laterally and outwardly from planar portion 200. When shield 36 is engaged to control device 34, lateral portions 226 extend between planar portion 200 and side projections 64, 65, respectively. Gripping hooks 222, 224 also include a longitudinally extending portion 228 which extends generally parallel to the long axis A of planar portion 200. When shield 36 is engaged to control device 34, the longitudinally extending portion 228 is disposed adjacent the underside surfaces 240, 242 of side projections 64, 65, respectively. Each gripping hook member 222, 224 also includes a fluke portion 232 having a beveled surface 234. The beveled surface 234 of fluke portions 232 is provided for engaging a portion of the side projections 64, 65, respectively, when the shield 36 is engaged to the electrical control device 34.

A pair of stiffening ribs 235, 236 are formed on the top surface 202 of shield 36 and extend laterally across the shield 36 between hook members 222, 224. The stiffening ribs 235, 236 impart a rigidity to the shield 36 to retard flexure of the shield about axis A.

A laterally outwardly extending flange member 238 is disposed adjacent aperture 206 and extends generally perpendicular to long axis A. In one embodiment, flange member 238 is approximately 0.25 inch (0.635 cm.) long. Flange member 238 is provided to engage the electrical control device between projections 80 of thermostat 42. Flange member 238 grips the control device 34 medially between its second 88 and third 90 side surfaces, and comprises the fourth point of the four-point connection of the instant invention.

To connect the shield 36 to the control device 34, the aperture 220 of first gripping member 218 is placed over top projection 94, to place the shield 36 in its proper longitudinal orientation on control device 34. Hook members 222, 224 are then spread outwardly away from each other to engage the side edges of their respective projections 64, 65. The shield 36 is then pushed toward the control device 34. Concurrently, the laterally outwardly extending flange member 238 is guided between projections 80 to place shield 36 in its proper lateral orientation on control device 34. Once gripping ring 218 has received projection 94 and flange 238 is received between projections 80, the shield 36 will be in its proper longitudinal and lateral orientation on device 34. The shield 36 is then pushed toward device 34 until the longitudinally extending portions 228 and fluke portions 232 have engaged the respective undersides 240, 242 of projections 64, 65 facing tank 12. Often, engagement is facilitated by pressing the top surface ridges 244, 246 of hook members 222, 224 toward the device 34. As will be appreciated, this four-point connection provides a secure attachment between the shield 36 and control device 34.

To remove the shield 36 from the control device 34, hook members 222, 224 are pulled outwardly away from each other and out of engagement with the undersides 240, 242 of projections 64, 65, and the shield 36 is pulled away from control device 34. The gripping engagement of the four point attachment prevents the shield 36 from being readily pulled off laterally. Although this procedure will be readily understood by adults, it is probably less likely to be understood, and consequently, accidentally removed by young children. To this extent, the attachment is relatively tamper-resistant.

Another embodiment of the instant invention is shown in FIG. 5. A shield 260 is provided for attachment to a circuit control device 262 having only a thermostat 264 and no circuit breaker. Control device 262 also includes a metal base plate 266 having ears (not shown) which provide nests for second 268 and third 270 side projections. Thermostat 264 is similar to the thermostat 42 shown in FIG. 1 and includes an outwardly extending top projection 272 and a control knob 274. Shield 260 is generally similar to shield 36 shown in FIGS. 1, 3 and 4, except that shield 260 will generally be longitudinally shorter than shield 36, since shield 260 covers a control device 262 having only a thermostat 264.

As there is no reset button on thermostat 264, shield 260 contains no circular aperture such as circular aperture 205 of shield 36. Further, only one laterally extending spacer is provided.

The C-shaped gripping ring member 318, first gripping hook member 322, second gripping hook member 324, laterally and outwardly extending member 326 and stiffening ribs (not shown) of shield 260 are all similar to their corresponding parts of shield 36. It will also be appreciated that shield 260 is attached onto, and removed from, control device 262 in generally the same manner as shield member 36 is attached onto and removed from control device 34, as described above.

Although the invention has been described in detail with reference to the two illustrated preferred embodiments, variations and modifications exist within the scope and sprit of the invention as described and as defined in the following claims.

What is claimed is:

1. An electrically insulative shield for covering and engaging a device in an electrical circuit having a top surface, at least three side surfaces, and at least three projections adjacent the device, a first projection extending outwardly from a first side surface, a second projection extending outwardly adjacent a second side surface and a thrid projection extending outwardly adjacent a third side surface, the shield comprising a generally planar portion bounded by an outside edge having first, second and third outside edge portions, a first gripping member extending outwardly from the planar portion, the gripping member including an apertured portion for receiving the first projection, a first gripping hook member disposed near the second outside edge portion, and extending outwardly from the planar portion to grip the second projection, and a second hook member disposed near the third outside edge portion of the planar portion, the second hook member extending outwardly from the planar portion to grip the third projection, each of the first and second hook members including a laterally extending portion, a longitudinally extending portion, and a fluke portion.

2. The shield of claim 1 wherein the planar portion is generally rectangular, the second and third edges being opposed edges, and the first gripping member being disposed adjacent the first edge portion.

3. The shield of claim 1 further comprising an outwardly extending flange member for gripping the device.

4. The shield of claim 1 wherein the planar portion includes a long axis generally parallel to the second and third edges and said laterally extending portion of each of the first and second hook members extends laterally and outwardly between the planar portion and its respective projection when the shield is engaged to the electrical device, the longitudinally extending portion of each of the first and second hook members extends generally parallel to the long axis of the planar portion, the longitudinally extending portion being disposed adjacent a surface of its respective projection when the shield is engaged to the device, and each fluke portion has a beveled surface for engaging a portion of its respective projection when the shield is engaged to the device.

5. The shield of claim 4 further comprising an outwardly extending flange member for gripping the device between a pair of projections disposed between said second side surface and third side surface of the device.

6. The shield of claim 1 wherein the planar portion is generally rectangular, having a long axis, and the second and third edges are opposed edges and extend generally parallel to the long axis.

7. An electrically insulative shield for covering and engaging an electrical control apparatus having a front surface including terminals for connecting the apparatus to a source of electricity, first, second and third side surfaces, a first projection extending outwardly from the first side surface, a second projection extending outwardly adjacent the second side surface and a thrid projection extending outwardly adjacent the third side surface, the shield comprising a planar portion for covering the front surface of the control apparatus having a long axis, and engagement means for removably engaging the planar portion to the control apparatus to provide at least a three point connection between the shield and apparatus when engaged, the engagement means including a first gripping member extending outwardly from the planar portion, the first gripping member including an apertured portion for receiving the first projection, a first gripping hook member extending outwardly from the planar portion to grip the second projection and a second hook member extending outwardly from the planar portion to grip the third projection, the first and second hook members being sufficiently spacially separated to substantially preclude movement of the shield about said axis, each of the first and second hook members including a laterally extending portion extending laterally and outwardly between the planar portion and its respective projection when the shield is engaged to said control apparatus, a longitudinally extending portion extending generally parallel to the long axis of the planar portion, the longitudinally extending portion being disposed adjacent a surface of its respective projection when the shield is engaged to the control apparatus and a fluke portion having a beveled surface for engaging a portion of its respective projection when the shield is engaged to the control apparatus.

8. The shield of claim 7 wherein said engagement means further includes a flange member extending laterally and outwardly from the planar portion for gripping said apparatus generally medially between said second and third sides, the flange member providing a fourth point of connection between the shield and the apparatus.

9. The shield of claim 7 further comprising an outwardly extending gripping flange member for gripping a pair of projections disposed on the control apparatus generally medially between said second and third side surfaces.

10. An electrically insulative shield for covering a generally rectangular device in an electrical circuit having an actuable control means accessible on a top surface, first and fourth opposed side surfaces, and second and third opposed side surfaces, a first projection extending from one of the first and fourth opposed side surfaces, a second projection extending outwardly adjacent the second side surface, a tnird projection extending outwardly adjacent the third side surface, and a pair of fourth projections disposed generally medially oetween the second and third side surfaces, the shield comprising a generally planar portion having a pair of opposed edge portions, and at least one aperture in the planar portion to enable a user to gain access to the control means of the circuit, a first, generally continuous C-shaped gripping member extending outwardly from the planar portion, the member including an aperture for receiving the first projection, first and second gripping hook members, the hook members being generally planar and extending outwardly from the planar portion in a plane generally normal to the plane of the planar portion, each hook member having a laterally extending portion, a longitudinally extending portion, and a fluke portion, the first and second hook members being disposed adjacent the second and third edges of the planar portion, for enabling the first hook member to grip the second projection and the second hook member to grip the third projection, and an outwardly extending gripping flange member for gripping the pair of fourth projections to grip the device generally medially between the second and third side surfaces.

* * * * *